United States Patent
Tiozzo

(10) Patent No.: US 7,962,233 B2
(45) Date of Patent: Jun. 14, 2011

(54) SYSTEM AND METHOD FOR HANDLING A PRODUCTION DISTURBANCE/OPPORTUNITY EVENT IN A PRODUCTION EXECUTION SYSTEM

(75) Inventor: Fabio Tiozzo, Chioggia (IT)

(73) Assignee: Siemens Aktiengesellschaft, Munich (DE)

( * ) Notice: Subject to any disclaimer, the term of this patent is extended or adjusted under 35 U.S.C. 154(b) by 308 days.

(21) Appl. No.: 12/148,740

(22) Filed: Apr. 22, 2008

(65) Prior Publication Data

US 2008/0294279 A1 Nov. 27, 2008

(30) Foreign Application Priority Data

May 24, 2007 (EP) .................................... 07010339

(51) Int. Cl.
*G06F 19/00* (2011.01)
*G06F 19/418* (2006.01)
*G06F 9/46* (2006.01)
*G06F 17/50* (2006.01)

(52) U.S. Cl. ................ 700/100; 700/105; 705/8; 703/1

(58) Field of Classification Search ................ 700/100, 700/105; 703/1; 705/8
See application file for complete search history.

(56) References Cited

U.S. PATENT DOCUMENTS

| | | | |
|---|---|---|---|
| 5,487,144 A * | 1/1996 | Takahashi et al. ............ 715/835 |
| 6,216,109 B1 * | 4/2001 | Zweben et al. .................... 705/8 |
| 6,356,797 B1 * | 3/2002 | Hsieh et al. ................... 700/101 |
| 6,546,300 B1 * | 4/2003 | Fukuda et al. ................. 700/100 |
| 6,889,178 B1 * | 5/2005 | Chacon ............................. 703/6 |
| 2002/0198616 A1 * | 12/2002 | Crampton et al. .............. 700/99 |
| 2008/0091289 A1 * | 4/2008 | Gozzi et al. ................... 700/100 |

FOREIGN PATENT DOCUMENTS

| | | |
|---|---|---|
| EP | 0 437 634 A1 | 7/1991 |
| EP | 0 987 613 A2 | 3/2000 |
| EP | 987613 A2 * | 3/2000 |
| EP | 1 659 521 A1 | 5/2006 |
| EP | 1659521 A1 * | 5/2006 |

OTHER PUBLICATIONS

Derwent Abstract—EP 0 987 613 A2; Mar. 22, 2000; Basf Aktiengesellschaft, D-67056 Ludwigshafen, Germany.

* cited by examiner

*Primary Examiner* — Albert Decady
*Assistant Examiner* — Sivalingam Sivanesan
(74) *Attorney, Agent, or Firm* — Laurence A. Greenberg; Werner H. Stemer; Ralph E. Locher

(57) ABSTRACT

A system for handling a production disturbance/opportunity event includes a network having data processing units running a MES software for controlling/monitoring a production process operating production components. A production modeler defines a plant model of the production process, and a production scheduler generates an executable production schedule for the execution of operating procedures for the production components. A production executor executes the production process following the generated executable production schedule, and a production disturbance/opportunity event identifier detects a production disturbance event and identifies a production opportunity event which allows to maintain an efficiency of the production process at least as close as possible to an efficiency given by the executable production schedule as originally generated by the production scheduler. The production scheduler re-calculates an amended executable production schedule incorporating the identified production opportunity event, and the production executor executes the production process now following the re-calculated executable production schedule.

12 Claims, 4 Drawing Sheets

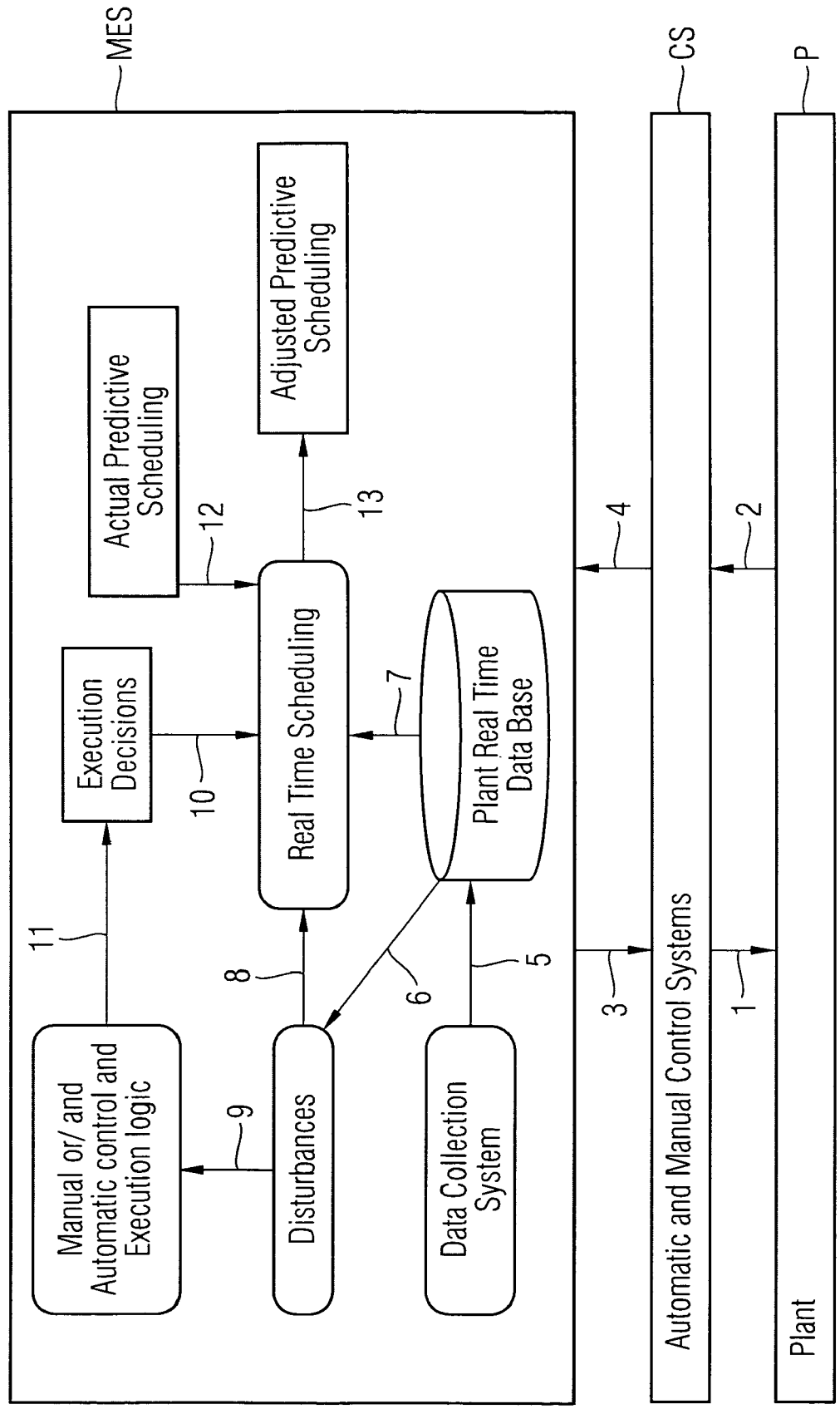

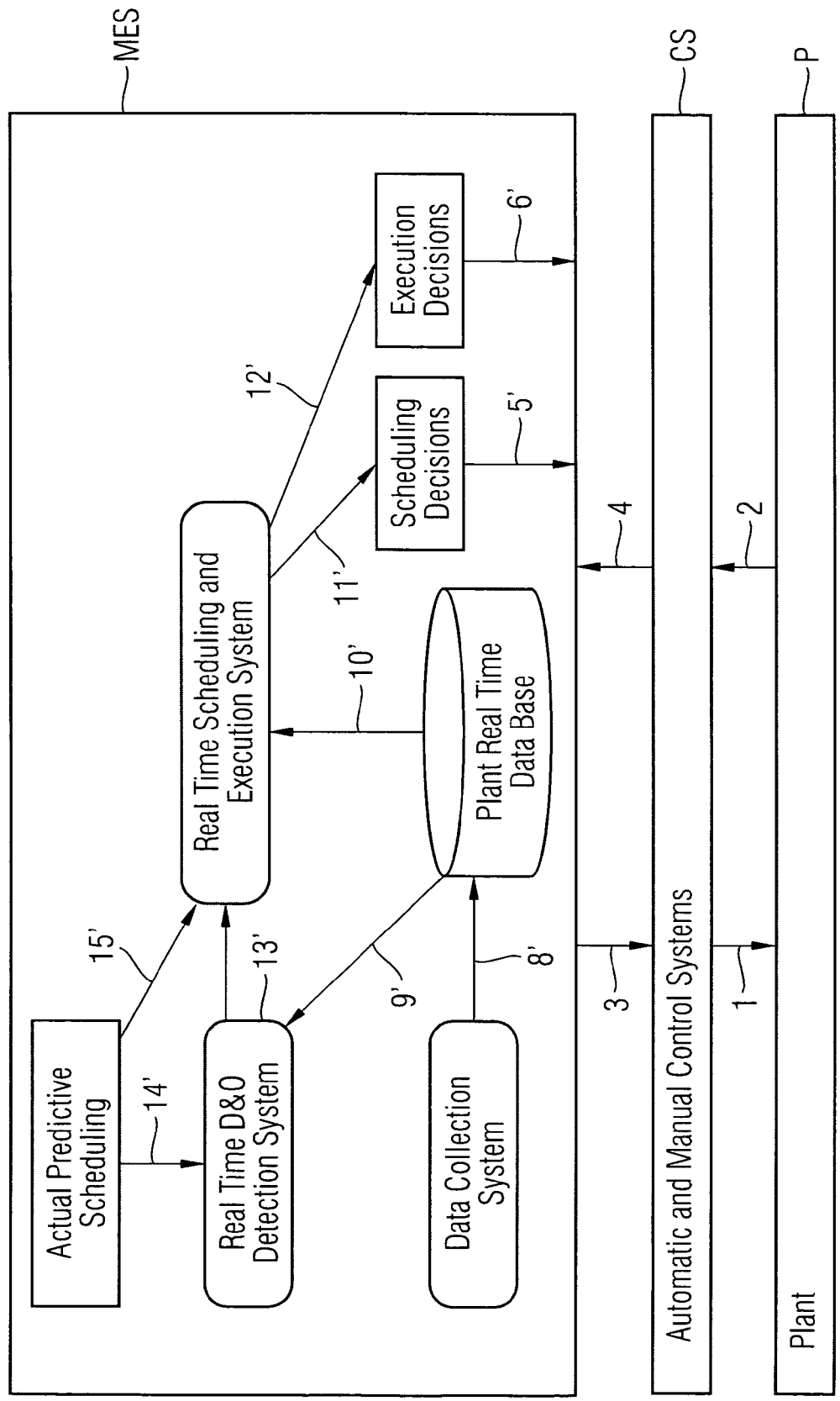

SYSTEM AND METHOD FOR HANDLING A PRODUCTION DISTURBANCE/OPPORTUNITY EVENT IN A PRODUCTION EXECUTION SYSTEM

BACKGROUND OF THE INVENTION

The present invention relates to a system and a method for handling a production disturbance/opportunity event in a production execution system.

In the world of process automation and process monitoring standard automation systems for controlling the widest conceivable variety of machines and plants are state of the art. Such technology covers in particular a broad range of products which are offered by the Siemens Corp. under its SIMATIC® product family with the field of manufacturing execution systems (MES). An extensive line of products for solving the technical tasks in question such as counting, measuring, positioning, motion control, closed-loop control and cam control enhance the performance capabilities of appropriate process controllers. A variety of configurations enable the implementation of flexible machine concepts.

In this context a broad range of IT solutions exist to connect the actual hardware close to the technical and/or logistical process to the application layer of the client driving the installation. Manufacturing execution systems have therefore been developed to meet all of the requirements of a service oriented architecture (SOA) to integrate seamless into a totally integrated automation (TIA). A plug & play architecture, in which the individual functions can be easily combined and configured with each other thereby forms the basis for this success thereby simplifying the complex structures of controlling a manufacturing plant or the like.

These demands very often require in the backbone rather complicated and sophisticated software solutions which enable the approach of totally integrated automation. In view of this, the software engineers very often use production moduler to define the plant model and its standard operating procedures and create the respective new software by means of a high level graphical language which identifies the workflow of activities within the software. Subsequently, this string/term of high level graphical language is translated into a client based software language executable on the machine language level. This translation requires tremendous efforts in programming and need serious testing to check whether the translated program behaves the same as the original string/term of the high level graphical language.

Within this MES environment a software for a detailed production scheduling (PDS) is provide which concerns the sequencing and the timing of production operations on all manufacturing resources. This software has the aim to create an executable and optimized production schedule that will be dispatched in production to be executed. Before the scheduling will be computed, the PDS software needs to feeded with the main input from a plant database such as:
  a) the plant logical layout and material flow constraints;
  b) the equipment and personnel standard production rates;
  c) the availability, the calendar and the status for the equipment and personnel;
  d) knowledge on the way of production (recipes, routings, etc.), process and business constraints.

Together with this information the PDS software builds its internal model of the plant and of the production process within this plant. Subsequently, by applying the scheduling algorithms to this internal plant model of the plant's resources and production process, the PDS software computes an executable and optimized production schedule which does not violate any physical, logistical and/or business constraints and which emphazises eventually an optimal respect of the manufacturing performances. The basic assumption of this computation lays in the plant and the production process model known at the beginning of the computation and at each moment of the scheduling time horizon.

Unfortunately, during the actual execution of the production schedule, only in an imaginary factory everything will work as it is assumed by the schedule. What happens in real environment is well known to any production manager: after the production schedule has been released for execution, unpredictable errors and failures occurs, such as:
  a) machine breakdowns;
  b) slowdown of production rates;
  c) quality problems on some material components delivered to production; and
  d) operators absenteeism.

For these reasons the basic assumption of deterministic and known plant conditions the production schedule was based on are no longer valid at execution time. This divergence could render the released production schedule as being not executable any longer or not as good as it was planned. In this case, these unpredictable events are called production disturbances (e.g. failure of a machine while it was working according to the schedule). On the other hand, there exist circumstances under which changes in plant condition could be favorable, such as a machine producing faster than the standard average production rate is planned to replace a slower one or after failure of a machine another machine can be allocated to this production chain. These also unpredictable events are hereinafter called production opportunities. In order to take advantage of such a production opportunity, the production schedule and/or other plant conditions should be modified as well.

SUMMARY OF THE INVENTION

The problem to be solved by this invention is that one of effectively managing production disturbances/opportunities and to get a new executable production schedule that:
  a) minimizes, at plant organizational level, the impact of the scheduled modifications; and
  b) at least maintains the manufacturing performance as close as to those previously planned.

So far as known in the prior art, such as present in the MES ISO-95 standard, the integration of fast scheduling algorithms (reactive, dynamic, dispatchers, etc.) to real time plant data collection systems. Some of these scheduling algorithms are based on scheduling methodologies having more a repair approach to keep the new production schedule as close as possible to the previous one. However, albeit the scheduling algorithm used, the scheduling algorithm takes plant conditions as input and applies exclusively scheduling decisions to solve a production disturbance.

As for an example, a production environment is assumed having a two-stage production environment in which products must be first processed by a machine of stage 1 which comprises two machines M1 and M3 and subsequently by a machine of stage 2 which comprises another two machines M2 and M4. Currently, it is further assumed that the machines are set to perform at the following production rates:
  a) Production rate of M1 is equal to production rate of M2;
  b) Production rate of M1 is equal to production rate of M2.

Furthermore, at the moment, M1 is connected to M2 and M3 is connected to M4 via conveyor belts which have a limited buffering capacity. Even if partially, the layout of the conveyor belts can be configurable to a certain extent if necessary (e.g. M1 can be connected either to M2 or to M4). Each modification of the conveyor belts layout has a given cost and elapsed time to perform any change. Products P0, P1, P2 and P3 must be produced in given quantities. Additionally, some constraints are given on the machine processing capabilities:

a) P0, P1, P2 and P3 can't be processed by machine M3;
b) P1 and P2 can be processed either by M2 or M4; and
c) P0 and P3 can't be processed by M4.

Given this layout and these process constraints a production schedule had been computed and had provided the following processing sequence on machine M1 and M2: P0, P1, P2, P3, being P0 the first in the list which the given presence of the conveyor belt and M1 and M2 having the same processing sequence.

As a further assumption, M1 is currently producing P0. During this production, surprisingly the following disturbance has been detected: Due to some mechanical problems, M2 is performing at 50% less than the standard production rate (value derived from the production detailed scheduling software for M2). A maintenance activity is required on M2 and it will take about an hour to bring M2 to its standard production rate. Given the limited buffering capacity of the conveyor, the production on M1 must be halted soon if no decisions are taken.

Traditional production detailed software solution do now behave at their best to try to update their internal model by getting the new plant conditions (new decreased production rate of M2) in order to run a re-scheduling process to search for the most appropriate solution. Given this situation, the only possible good scheduling decision could be: Stop production on M1 till the scheduled moment in which M2 will be re-established at its standard production rate.

On the other hand, an manufacturing execution system could choose one of the following execution decisions:

a) Decrease the production rate of M1 in order to have the productivities of M1 and M2 balanced;
b) Reconfigure quickly the conveyor system to connect M1 to M4 and set the production rate of M4 equal to that one of M1.

This last solution will not lead to any advantage because of the scheduled production sequence (P0, P1, P2, P3) as P0 and P3 can't be processed on M4.

Both the above scheduling decisions and the execution decisions taken separately into account will not lead to an optimized solution to manage the disturbance event on M2 since it will occur that the productivity would be lost not only on M2 but also on M1.

It is therefore the object of the present invention to provide a system and a method for handling a production disturbance/opportunity event in a way that the overall production efficiency of a production process will be at least maintained at a level as close as possible to the original scheduled level.

Accordingly, one aspect involves a system for handling a production disturbance/opportunity event in a production execution system including a network having a number of data processing units running a MES software for controlling/monitoring a production process operating a number of production components. A production modeler within the MES software defines a plant model of the production process, and a production scheduler within the MES software generates an executable production schedule for the execution of operating procedures for the production components. A production executor within the MES software executes the production process following the generated executable production schedule, and a production disturbance/opportunity event identifier within the MES software detects a production disturbance event and identifies a production opportunity event which allows to maintain an efficiency of the production process at least as close as possible to an efficiency given by the executable production schedule as originally generated by the production scheduler. The production scheduler re-calculates an amended executable production schedule incorporating the identified production opportunity event, and the production executor execute the production process now following the re-calculated executable production schedule.

Another aspect involves a method for handling a production disturbance/opportunity event in a manufacturing execution system. The method includes providing a network having a number of data processing units running a MES software for at least one of controlling and monitoring a production process operating a number of production components, and enabling a production modeler within the MES software to define a plant model of the production process. Further, the method includes enabling a production scheduler within the MES software to generate an executable production schedule for the execution of operating procedures for the production components related to the plant model of the production process, and enabling a production executor within the MES software to execute the production process following the generated executable production schedule. Furthermore, the method includes enabling a production disturbance/opportunity event identifier within the MES software to detect a production disturbance event and to identify a production opportunity event which allows to maintain an efficiency of the production process at least as close as possible to an efficiency given by the executable production schedule as originally generated by the production scheduler. The production scheduler re-calculates an amended executable production schedule incorporating the identified production opportunity event. The production executor executes the production process following the re-calculated executable production schedule.

This system and this method therefore now allow to combine for the disturbance/opportunity event management both a well distinguished mixture of scheduling and execution decisions in order to save the original scheduled production rate as best as possible. To give an example what is meant for scheduling decisions, a few of them are listed below:

a) change a previously allocated resource to a production operation;
b) change a previously scheduled production sequence on the resources;
c) change the previously computed timing of production operations.

To give an example what is meant for execution decisions, a few of them are listed below, too:

a) changing a production rate of some equipment;
b) making an equipment activated (switch it on);
c) change the configuration of flexible production lines (e.g. flexible conveyor systems, highly configurable assembly lines, etc.);
d) substitute a defective component with an alternative one that can be delivered to the equipment in a given amount of time;
e) last-minute decision to required a certain amount of overtime to some workers.

Since it is now possible to involve at the same time both scheduling and execution decisions into the real time management of disturbance/opportunity events, the production manager within the plant can effectively manage them. While scheduling decisions are related to production operations (e.g. allocations of operations to equipment, sequencing and timing of production operations) and execution decision are mostly related to resources, processes and material conditions the mixture of both taken within the same moment and within the same stringent system gets the plant manager the unique chance to operate his plant at least as close as possible to the original scheduled performances.

In order to simplify and at least partly automize the decision finding after a disturbance/opportunity event has been detected a rule table is provided within the MES Software assigning to each production disturbance event a number of production opportunity events. That means to the extent possible a predefinition of measures that can be taken into account when a disturbance event occurs and the system then is trigged to design a way out of this dilemma.

Consequentially, in a further preferred embodiment of the present invention the production disturbance/opportunity event identifier may be further enabled to automatically decide for the production opportunity event fitting best with an intended efficiency achieved with the actual executable production schedule. To assign this authority to the production disturbance/opportunity identifier takes a significant burden from the plant's production manager who has not to interfere personally during production at urgency level with all the disadvantages combined when decisions have to be taken under utterly urgency without knowing the complete circumstances.

Additionally or alternatively, the disturbance/opportunity event identifier is further enabled to offer a number of production opportunity events for election to a system user. This feature allows to the plant's production manager to participate in the disturbance event management process under expert condition insofar as he can already rely upon proposals for decisions which have been pre-evaluated by the disturbance/opportunity event identifier at expert level.

BRIEF DESCRIPTION OF THE SEVERAL VIEWS OF THE DRAWINGS

Preferred examples of the present invention are discussed in detail below with reference to the following drawings, wherein:

FIG. 3 depicts a schematic overview over the activities and the main information flows within a manufacturing execution system according to the prior art; and FIG. 4 depicts a schematic overview over the activities and the main information flows with a manufacturing executions system according to the present invention.

DETAILED DESCRIPTION OF THE INVENTION

Figure 1:
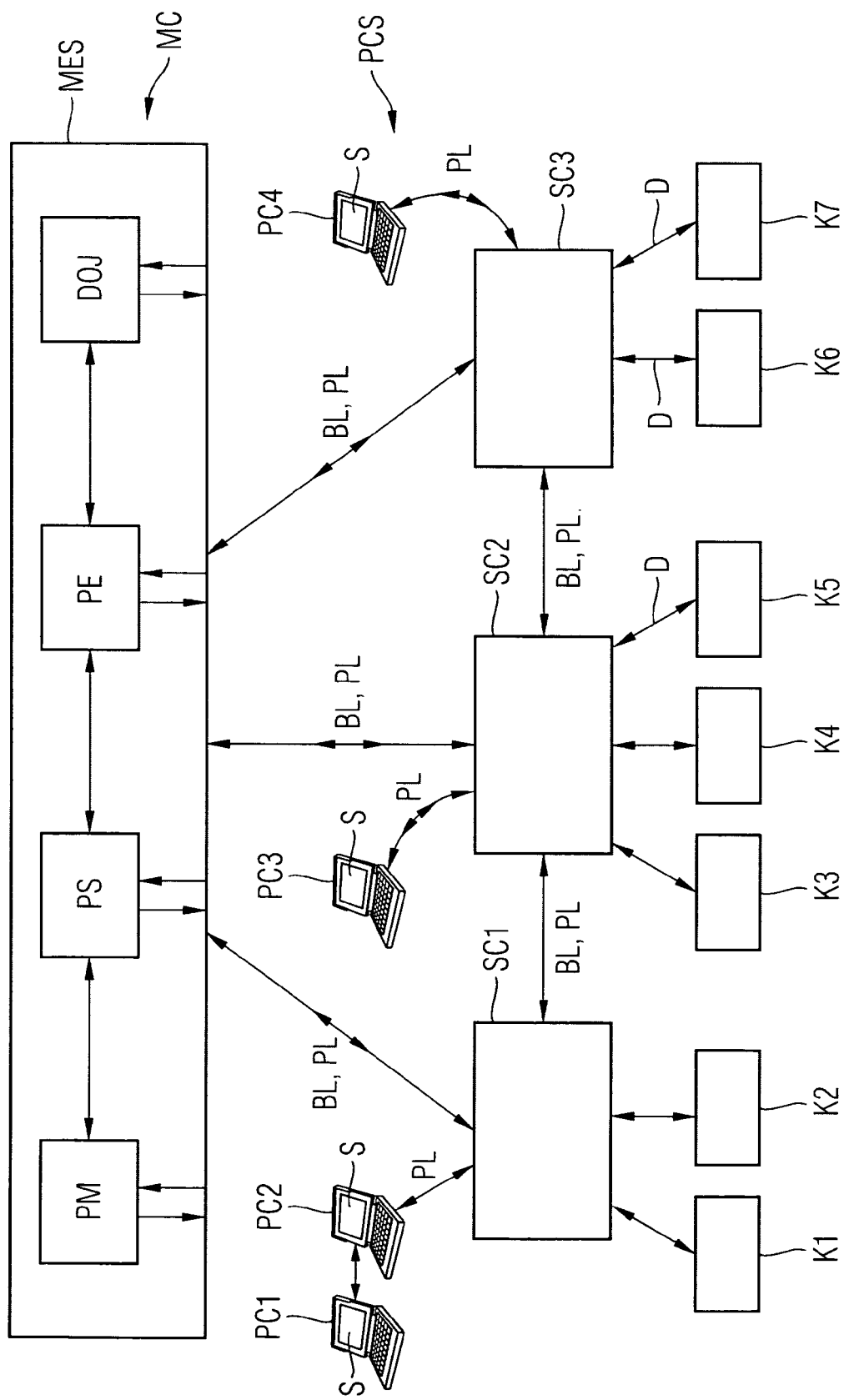
FIG. 1 depicts a schematic overview of a manufacturing execution system and the MES software components incorporated therein.

FIG. 1 illustrates a schematic overview of a plant control system PCS comprising a manufacturing execution system MES. The system PCS comprises a number of data processing units MC, SC1, SC2, SC3 running a MES software for controlling and/or monitoring a production process operating a number of production components K1 to K7. The production components K1 to K7 can be sensors, actuators, motors, step drives, conveyors, valves, pumps and the like. The data processing units MC, SC1, SC2 and SC3 are network computer which comprises logical units, calculation means, storage means, display means and the like. The data processing units MC, SC 1, SC2 and SC3 are connected within a plant network in order to exchange data to the required extent. One of the data processing units, hereinafter referred to a master console MC, is executing the MES software for controlling and monitoring the operation of the plant.

The master console MC comprises in terms of logical units realized by the MES software the following components:
a) a production modeler PM within the MES software enabled to define a plant model of the production process;
b) a production scheduler PS within the MES software enabled to generate an executable production schedule for the execution of operating procedures for the production components K1 to K7 related to the plant model of the production process;
c) a production executor PE within the MES software enabled to execute the production process following the generated executable production schedule;
d) a production disturbance/opportunity event identifier DOI within the MES software being enabled to detect a production disturbance event and to identify a production opportunity event which allows to maintain an efficiency of the production process at l east as close as possible to an efficiency given by the executable production schedule as originally generated by the production scheduler PS;
e) said production scheduler PS further enabled to re-calculate an amended executable production schedule incorporating the identified production opportunity event, and
f) said production executor PE further enabled to execute the production process now following the re-calculated executable production schedule.

The production modeler PM is enabled to define a business logic BL within a fully graphical environment as fascilitated by the MES software. The business logic BL, when finally generated by the production modeler PM, comprises a plant model of the production process and the related operating procedures for the production components K1 to K7 in a fully graphical environment. Even for the creation of the business logic BL high-level graphical language is used within the MES software, preferably consistently with the ISA-95 standard. The master console MC further comprises a client application builder CAB within the MES software being enabled to provide a native, WEB based graphical user interface for generating cross-functionality graphic screens S, said screens forming part of the network as presentation clients PC, PC1 to PC4 and displaying data D which is stemming from the production components K1 to K7 and which is manipulated from the business logic BL by the production modeler PM, where it is required, i.e. when the data stemming from one of the production components K1 to K7 has to further processed or averaged with data stemming from other production components.

Additionally, the production modeler PM is also enable to define a presentation logic PL. The presentation logic is provided to operate the cross-functionality graphic screens S with respect to their content of the data D at the presentation clients PC1 to PC4. This presentation logic PL can be therefore developed within the same environment as used to define the business logic BL.

Figure 2:
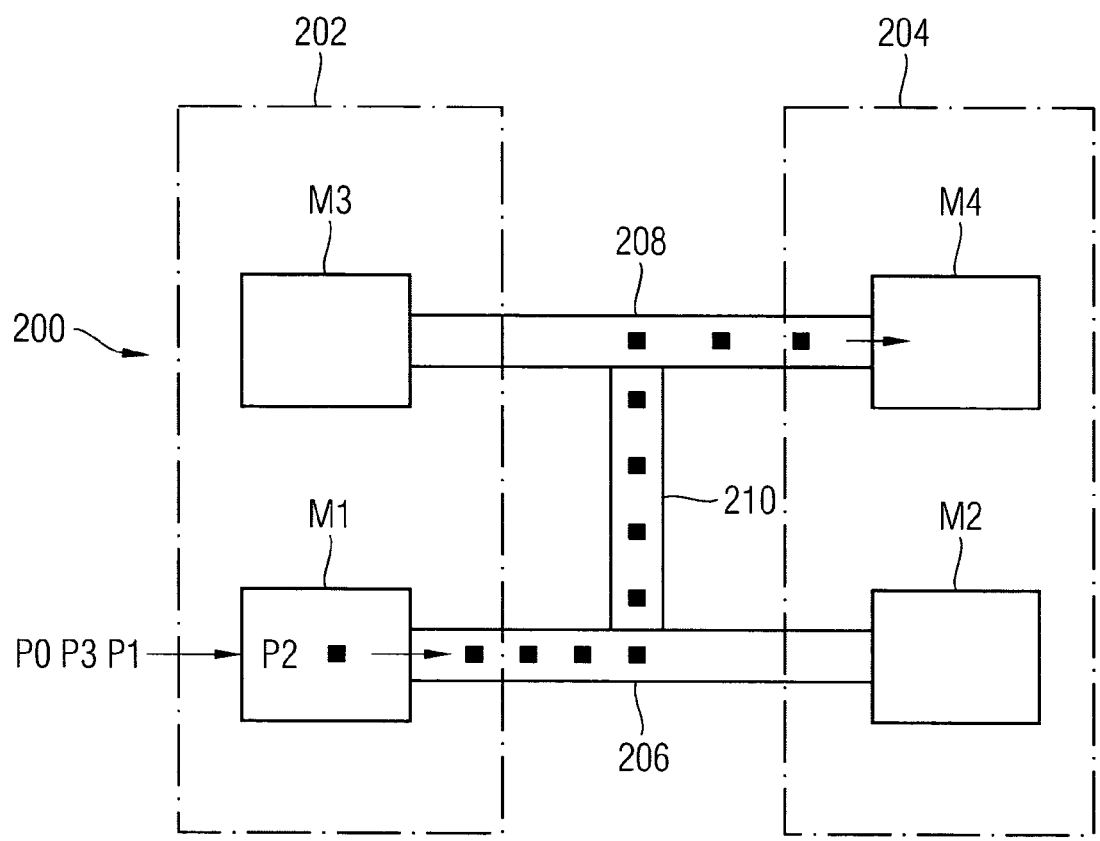
FIG. 2 depicts a schematic example a production re-scheduling according to a mixture of scheduling and execution decisions.

With reference to FIG. 2, a schematic overview is shown over a re-scheduling of a production process according to a mixture of scheduling and execution decisions after a disturbance event has been detected by the DOI. Reference is made to the example which has been used to describe the prior art systems and methods above. All opportunities and constraints are further applicable. The figure depicts a first production stage 202 and a second production stage 204 of a production plant 200. With the first production stage 202 machine M1 and M3 and with the second production stage 204 machines M2 and M4 are engaged. A first conveyor 206 links the machine M1 to the machine M2; a second conveyor 208 links the machine M2 to the machine M4. A deflection conveyor 210 connects the first conveyor 206 to the second conveyor 208 in order to allow the linking of the machine M1 to the machine M4 or the linking of the machine M3 to the machine M2.

The DOI is now checking the process for the violation of predefined threshold. The data acquired by the DOI is therefore specified in order to monitor the normal workflow as given by the production schedule derived from the production scheduler PS. Due to the disturbance occurred (here the decrease of the productivity at the machine M2), the production disturbance/opportunity identifier DOI now investigating which measures have been defined in a rule table to manage this type of disturbance. Subsequently, the DOI identifies an optimal solution to manage the disturbance according to the following decisions:

1. Find a new feasible production sequence: P2, P1, P3, P0 on the machine M1 which is considered as a scheduling decision;
2. Change the conveyor configuration in order to connect M1 to M4 which is considered to be an executions decision;
3. Set production rate to the machine M4 to run at the same production rate of the machine M1 which is considered again an execution decision;
4. Decide to produce now P2 and P1 on the machines M1 and M4 which is considered to be a scheduling decision;
5. Start maintenance at time $t_1$ on the machine M2 to re-establish its efficiency to its standard level which is considered to be an execution decision;
6. Re-configure at time $t_2$ the conveyor configuration to re-connect the machine M1 and M2 which is considered again an execution decision; and
7. Produce products P3 and P0 on the machines M1 and M2.

This innovative approach of combining both scheduling and execution decisions in a single optimization engine (the DOI) which is fully embedded in the real time manufacturing execution system MES guarantees an effective real time management of disturbance events. Other than in the system known in the prior art, the MES software now comprises a highly effective engine to manage not only a disturbance as it is but to re-schedule the complete production process taking the actual plant conditions including a sudden disturbance event as granted. This approach enables the manufacturing execution system MES and its software, in particular its production detailed scheduler module (the PS), re-define a production process from scratch after a relevant disturbance event has been detected.

FIG. 3 illustrates in the light of the afore-mentioned example a schematic overview over the activities and the main information flows within a manufacturing execution system according to the prior art. Any arrow numbered with numerals shall indicate a flow of data. At 1 and 2 data stemming from the plant goes to the automatic and manual control system of the plant and vice versa resp. At 3 and 4 data stemming from the automatic and manual control system of the plant goes to the manufacturing execution system MES. At 5 the data stemming from the plant is provided to a plant real time data base. Under normal circumstances the data from the plant real time data base is delivered at 7 to the real time scheduling which receives at 10 the data from the execution decision and at 12 the data from the actual predictive scheduling. The execution decisions have been received at 11 from the manual and/or automatic control and execution system logic.

In case of a disturbance, this disturbance is identified by the disturbance identifier which receives at 6 the data necessary to fulfill this service from the plant real time data base. Once a disturbance event is identified, the corresponding notification data is given at 9 to the manual and/or automatic control and execution logic. Over 11 data indicating the disturbance are forwarded to the execution decision block which release over 10 amended execution decisions which will be forwarded from the real time scheduling block at 13 over to an adjusted predictive scheduling. Final decision whether or not to activate the adjusted predictive scheduling as the valid schedule have to be taken manually by the production manager at the automatic and manual plant control system. Again, the disadvantages of this solution are obvious. Execution decisions and scheduling decision are not met simultaneously within the same instance and within the same system since the manufacturing execution system and the automatic and manual control system are completely different from each other.

FIG. 4 now illustrates schematically an overview over the activities and the main information flows with a manufacturing executions system according to the present invention. Again, at 1 and 2 data stemming from the plant goes to the automatic and manual control system of the plant and vice versa resp. At 3 and 4 data stemming from the automatic and manual control system of the plant goes to the manufacturing execution system MES. At 8' the data stemming from the plant is provided to a plant real time data base. At 9' real time data from the plant real time data base goes to a real time disturbance/opportunity detection system that receives at 14' the data indicating the actual predictive scheduling. That means that at the time being, the real time disturbance/opportunity detection system knows the actual predictive schedule to the same extent as this data is delivered at 15' to the real time scheduling and execution system that receives at 10' the data stemming from the real time plant data base. The real time scheduling and execution system itself forwards at 11' and 12' its scheduling decisions and its executions decisions resp. which are forwarded at 5' and 6'resp. directly into the automatic and manual control system.

This new approach now offers the opportunity that the real time disturbance/opportunity detection systems not only identifies a disturbance but also decides in knowledge of the actual predictive scheduling upon a new amended scheduling by re-computing the scheduling later on under the new scheduling and execution decisions. Therefore, at plant control level no further decisions have to be taken since both the new execution process and the new scheduling has been now identified in the manufacturing execution system.

What is claimed is:

1. A system for handling a production disturbance/opportunity event in a production execution system, comprising:
   a network comprising a plurality of data processing units running a MES software for at least one of controlling and monitoring a production process operating a number of production components;
   a production modeler within the MES software enabled to define a plant model of the production process;
   a production scheduler within the MES software enabled to generate an executable production schedule for the execution of operating procedures for the production components related to the plant model of the production process;

a production executor within the MES software enabled to execute the production process following the generated executable production schedule; and a production disturbance/opportunity event identifier within the MES software being enabled to detect a disturbance/opportunity event selected from the group consisting of a production disturbance event and a production opportunity event;

wherein a single optimization engine simultaneously takes into account scheduling and execution decisions while recalculating a new production schedule and a new execution schedule based on the disturbance/opportunity event that has been detected.

2. The system of claim 1, wherein a rule table is provided within the MES Software assigning to each production disturbance event a number of production opportunity events.

3. The system of claim 2, wherein the production disturbance/opportunity event identifier is further configured to automatically decide for the production opportunity event fitting best with an intended efficiency achieved with the actual executable production schedule.

4. The system of claim 1, wherein the disturbance/opportunity event identifier is further configured to offer a number of production opportunity events for election to a system user.

5. The system of claim 1, wherein the disturbance/opportunity event identifier is further configured to simultaneously release a combination of scheduling decisions and execution decisions.

6. The system of claim 1, wherein the optimization engine is the production disturbance/opportunity event identifier.

7. A method for handling a production disturbance/opportunity event in a manufacturing execution system, comprising:

providing a network comprising a number of data processing units running a MES software for at least one of controlling and monitoring a production process operating a number of production components;

enabling a production modeler within the MES software to define a plant model of the production process;

enabling a production scheduler within the MES software to generate, an executable production schedule for the execution of operating procedures for the production components related to the plant model of the production process;

enabling a production executor within the MES software to execute the production process following the generated executable production schedule;

enabling a production disturbance/opportunity event identifier within the MES software to detect a disturbance/opportunity event selected from the group consisting of a production disturbance event and a production opportunity event;

enabling a single optimization engine to simultaneously take into account scheduling and execution decisions while recalculating a new production schedule and a new execution schedule based on the disturbance/opportunity event that has been detected.

8. The method of claim 7, wherein a rule table is provided within the MES Software assigning to each production disturbance event a number of production opportunity events.

9. The method of claim 7, wherein the production disturbance/opportunity event identifier is further enabled to automatically decide for the production opportunity event fitting best with an intended efficiency achieved with the actual executable production schedule.

10. The method of claim 7, wherein the disturbance/opportunity event identifier is further enabled to offer a number of production opportunity events for election to a system user.

11. The method of claim 7, wherein the disturbance/opportunity event identifier is further enabled to simultaneously release a combination of scheduling decisions and execution decisions.

12. The method of claim 7, wherein the optimization engine is the production disturbance/opportunity event identifier.

\* \* \* \* \*